(12) United States Patent
Nishida

(10) Patent No.: US 9,467,438 B2
(45) Date of Patent: Oct. 11, 2016

(54) INFORMATION PROCESSING SYSTEM, APPARATUS, AND METHOD

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 14/305,078

(22) Filed: Jun. 16, 2014

(65) Prior Publication Data

US 2015/0026340 A1    Jan. 22, 2015

(30) Foreign Application Priority Data

Jul. 22, 2013 (JP) ................................. 2013-151537

(51) Int. Cl.
*G06F 3/12* (2006.01)
*H04L 29/06* (2006.01)

(52) U.S. Cl.
CPC ................................. *H04L 63/0807* (2013.01)

(58) Field of Classification Search
CPC ... H04L 51/22; H04L 51/28; H04L 63/0838; G06F 21/31; G06F 3/1222; G06F 3/1238; G06F 3/1287
USPC ....................................................... 709/225
See application file for complete search history.

(56) References Cited

U.S. PATENT DOCUMENTS

| 7,375,835 B1* | 5/2008 | Hull | H04L 51/08 358/1.15 |
| 8,629,999 B2 | 1/2014 | Nishida | |
| 2006/0026103 A1* | 2/2006 | Lee | G06F 21/10 705/51 |
| 2012/0300268 A1 | 11/2012 | Oseto et al. | |
| 2013/0094053 A1* | 4/2013 | Shirai | G06F 3/1222 358/1.15 |
| 2013/0329245 A1 | 12/2013 | Nishida | |
| 2013/0346510 A1* | 12/2013 | Mohit | G06Q 10/107 709/206 |
| 2014/0211233 A1* | 7/2014 | Biswal | G06F 3/1238 358/1.14 |

FOREIGN PATENT DOCUMENTS

| JP | 2001-051915 | 2/2001 |
| JP | 2004-236348 | 8/2004 |
| JP | 2012-248006 | 12/2012 |
| JP | 2014-016979 | 1/2014 |

* cited by examiner

*Primary Examiner* — Ruolei Zong
(74) *Attorney, Agent, or Firm* — IPUSA, PLLC.

(57) ABSTRACT

An information processing system, which includes one or more computers, includes a reception part configured to receive a request addressed to a predetermined destination, a generation part configured to generate authority identification information for identifying operation authority to operate an apparatus, where the authority identification information has a validity period according to the request, and a transmission part configured to transmit the authority identification information to the transmission source of the request.

12 Claims, 11 Drawing Sheets

FIG.6

| USERNAME | PASSWORD | EMAIL ADDRESS | ... |
|---|---|---|---|
| A | ..... | aaa@xxxxx | ..... |
| B | ..... | bbb@xxxxx | ..... |
| .. | .. | .. | .. |

| JOB NAME | USER MODE | USERNAME | PIN CODE | PRINT DATA | ... |
|---|---|---|---|---|---|
| XXX | G | A | F12 | ... | ... |
| YYY | U | A | | ... | ... |
| .. | .. | .. | .. | .. | .. |

| EMAIL ADDRESS | PIN CODE | AUTHORIZED USERNAME | EXPIRATION DATE |
|---|---|---|---|
| aaa@xxxxx | F93 | A | 2013-02-09 00:00:00 |
| bbb@xxxxx | A98 | A | 2012-12-31 01:20:00 |
| ccc@xxxxx | P23 | B | 2008-10-19 22:09:00 |
| xxx@xxxxx | L30 | B | 2013-07-04 15:18:00 |
| yyy@xxxxx | W52 | A | 2013-07-05 00:47:00 |

INFORMATION PROCESSING SYSTEM, APPARATUS, AND METHOD

CROSS-REFERENCE TO RELATED APPLICATION

The present application is based upon and claims the benefit of priority of Japanese Patent Application No. 2013-151537, filed on Jul. 22, 2013, the entire contents of which are incorporated herein by reference.

BACKGROUND OF THE INVENTION

1. Field of the Invention

The present invention relates to information processing systems, apparatuses, and methods.

2. Description of the Related Art

Some image forming apparatuses such as printers and multifunction peripherals installed in an office are set so as to be available only for users who have been given authority to operate the image forming apparatuses in advance. For example, there are image forming apparatuses that are available only for users who have registered accounts corresponding to the operation authority and are authenticated based on their accounts. Reference may be made to Japanese Laid-Open Patent Applications No. 2004-236348 and No. 2001-051915 for related art.

SUMMARY OF THE INVENTION

According to an aspect of the present invention, an information processing system, which includes one or more computers, includes a reception part configured to receive a request addressed to a predetermined destination, a generation part configured to generate authority identification information for identifying operation authority to operate an apparatus, where the authority identification information has a validity period according to the request, and a transmission part configured to transmit the authority identification information to the transmission source of the request.

According to an aspect of the present invention, an information processing apparatus includes a reception part configured to receive a request addressed to a predetermined destination, a generation part configured to generate authority identification information for identifying operation authority to operate an apparatus, where the authority identification information has a validity period according to the request, and a transmission part configured to transmit the authority identification information to the transmission source of the request.

According to an aspect of the present invention, an information processing method includes receiving a request addressed to a predetermined destination, generating authority identification information for identifying operation authority to operate an apparatus, where the authority identification information has a validity period according to the request, and transmitting the authority identification information to a transmission source of the request. An information processing system including one or more computers executes the above-described receiving, generating and transmitting.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating a configuration of a user information storage part according to the first embodiment;

FIG. 7 is a diagram illustrating a configuration of a print information storage part according to the first embodiment;

FIG. 8 is a diagram illustrating a configuration of a PIN code storage part according to the first embodiment;

DETAILED DESCRIPTION OF THE PREFERRED EMBODIMENTS

As mentioned above, there are image forming apparatuses that are available only for users authenticated based on their registered accounts. It is difficult, however, for guest users who do not have pre-registered accounts, such as visitors in the office, to use such image forming apparatuses. In response to this, for example, a guest account may be prepared and each guest user may log on using the common guest account. In this case, however, it is difficult to ensure security between guest users.

According to an aspect of the present invention, it is possible even for users who have not been given operation authority in advance to use apparatuses.

Figure 1:
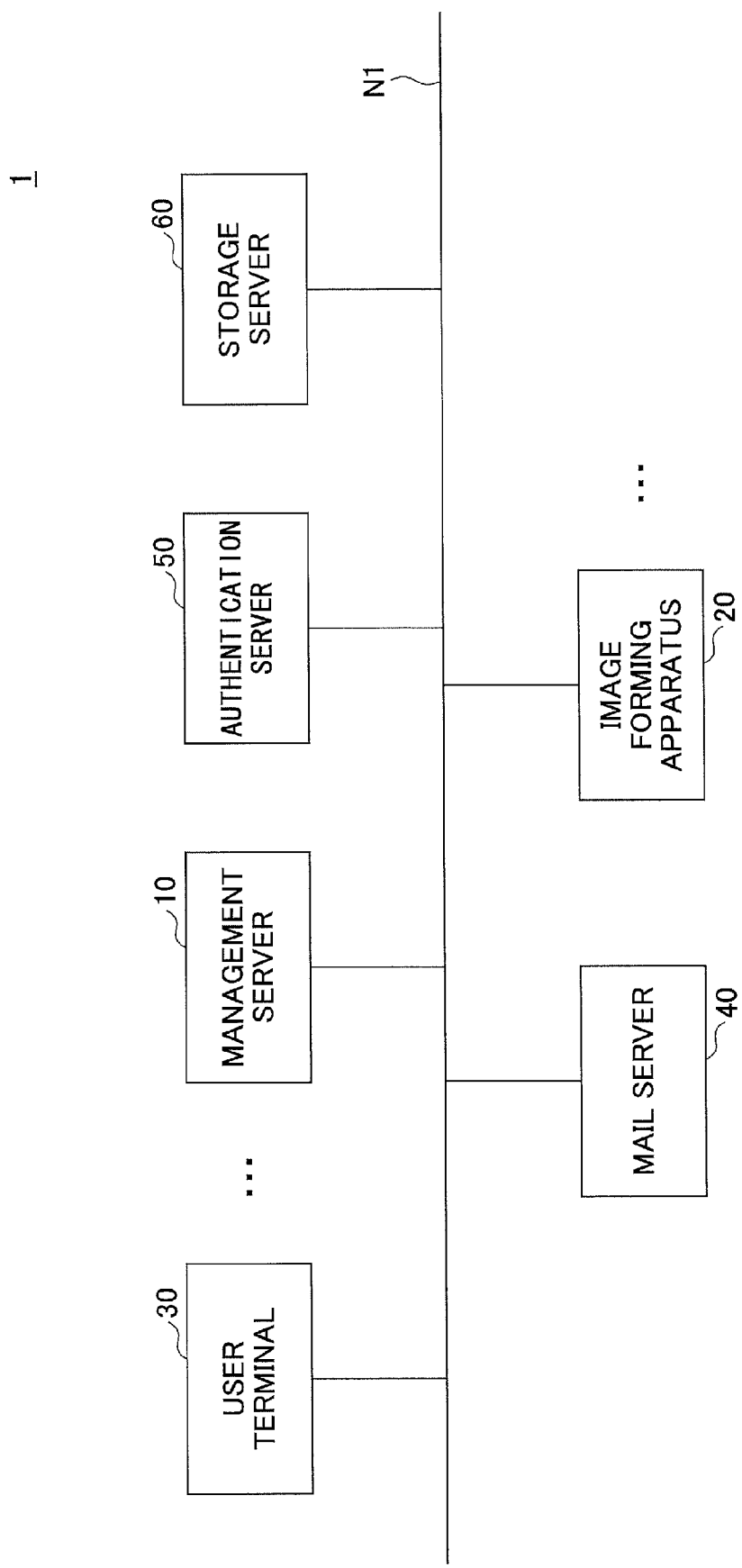
FIG. 1 is a diagram illustrating a configuration of an information processing system according to a first embodiment.

A description is given below, with reference to the accompanying drawings, of embodiments of the present invention. FIG. 1 is a diagram illustrating a configuration of an information processing system according to a first embodiment. Referring to FIG. 1, an information processing system 1 includes at least one user terminal 30, a mail server 40, a management server 10, an authentication server 50, a storage server 60, and at least one image forming apparatus 20, all of which are interconnected by a network N1 such as a local area network (LAN) or the Internet so as to be able to communicate with one another. The network N1 may be partly or entirely a wireless communications network. Further, there may be a mobile communication network between the user terminal 30 and the network N1. It is assumed that the information processing system 1 is operated in an organization such as a company. In the first embodiment, this organization is referred to as "Company A."

The user terminal 30 is an information processing apparatus directly operated by a user of the information processing system 1. For example, the user operates the user terminal 30 to input a request (print request) to the information processing system 1 for printing. Examples of the user terminal 30 include personal computers (PCs), cellular phones, smartphones, tablet terminals, and personal digital assistants (PDAs). In the case where there are two or more user terminals 30, the user terminals 30 may be different in machine type from each other.

In this embodiment, users of the information processing system 1 are divided into "authorized users" and "guest users." Authorized users are users who have been given authority to operate the image forming apparatus 20 in advance. That is, authorized users are those who are predetermined as users of the information processing system 1. Examples of authorized users include employees of Company A. Guest users are users who are not given authority to operate the image forming apparatus 20. Examples of guest users include those other than employees of Company A, such as visitors to Company A. In the information processing system 1, the distinction between authorized users and guest users is made based on whether an account corresponding to the authority to operate the image forming apparatus 20 is registered (technically speaking, with user information storage part 52 described below). The user terminal 30 may be an information processing apparatus privately owned by an authorized user or a guest user.

The mail server 40 is a computer that transfers an electronic mail (email) message transmitted from the user terminal 30 and an email message transmitted from the management server 10. For example, in response to a user's command, the user terminal 30 transmits an email message including a print request to the management server 10. The electronic data of an object of printing are attached to the email message including a print request. The data format of the electronic data is not limited to a predetermined format. The email message including a print request transmitted from the user terminal 30 is hereinafter referred to as "print request email message." Furthermore, in response to a user's command, the user terminal 30 transmits an email message that indicates a request for issuance of a personal identification number (PIN) code (hereinafter referred to as "PIN request email message") to the management server 10. In this embodiment, the PIN code is an example of temporary or quasi identification information corresponding to authority to operate the image forming apparatus 20 that substitutes for a username and a password to make the image forming apparatus 20 temporarily available.

The authentication server 50 is a computer that manages information on each authorized user including the username, password, and email address of the authorized user (hereinafter referred to as "user information"). For example, the authentication server 50 executes an authentication process in response to an authentication request in which a username and a password are specified. Furthermore, the authentication server 50 executes a process corresponding to an email address existence determination request for the determination of the existence of an email address and a process corresponding to a username obtaining request for the obtaining of a username corresponding to an email address.

The management server 10 is a computer or a computer system including one or more computers that issues a PIN code in response to reception of a PIN request email message. Furthermore, the management server 10 generates print data with respect to the electronic data attached to a print request email message (hereinafter also referred to as "data attachment") in response to the reception of the print request email message. The print data have a data format interpretable by the image forming apparatus 20. The management server 10 associates the generated print data with the username of a user who is a source (a transmitter) of the print request email message or with a PIN code, and transmits the generated print data associated with the username or PIN code to the storage server 60. When the source address of the print request email message is managed in correlation with a username by the authentication server 50, the print data are associated with the username. When the source address of the print request email message is not managed in correlation with a username by the authentication server 50, the management server 10 issues a PIN code. When a PIN code is issued, the print data are associated with the PIN code instead of a username.

The storage server 60 is a computer that stores print data transmitted from the management server 10.

The image forming apparatus 20 is an apparatus that executes a job related to scanning, a job related to copying, a job related to printing, and a job related to facsimile (FAX) transmission and reception. An apparatus that does not execute one or more of these jobs may also be used as the image forming apparatus 20. The image forming apparatus 20 executes a job requested by a user when authentication based on the username and password or the PIN code input by the user succeeds. For example, the image forming apparatus 20 prints print data associated with the username or PIN code input by an authenticated user among the print data stored in the storage server 60.

The management server 10, the authentication server 50, and the storage server 60 may be implemented by a single server, or the number of servers implementing (constituting) the management server 10, the authentication server 50, and the storage server 60 may be suitably determined depending on operations.

Figure 2:
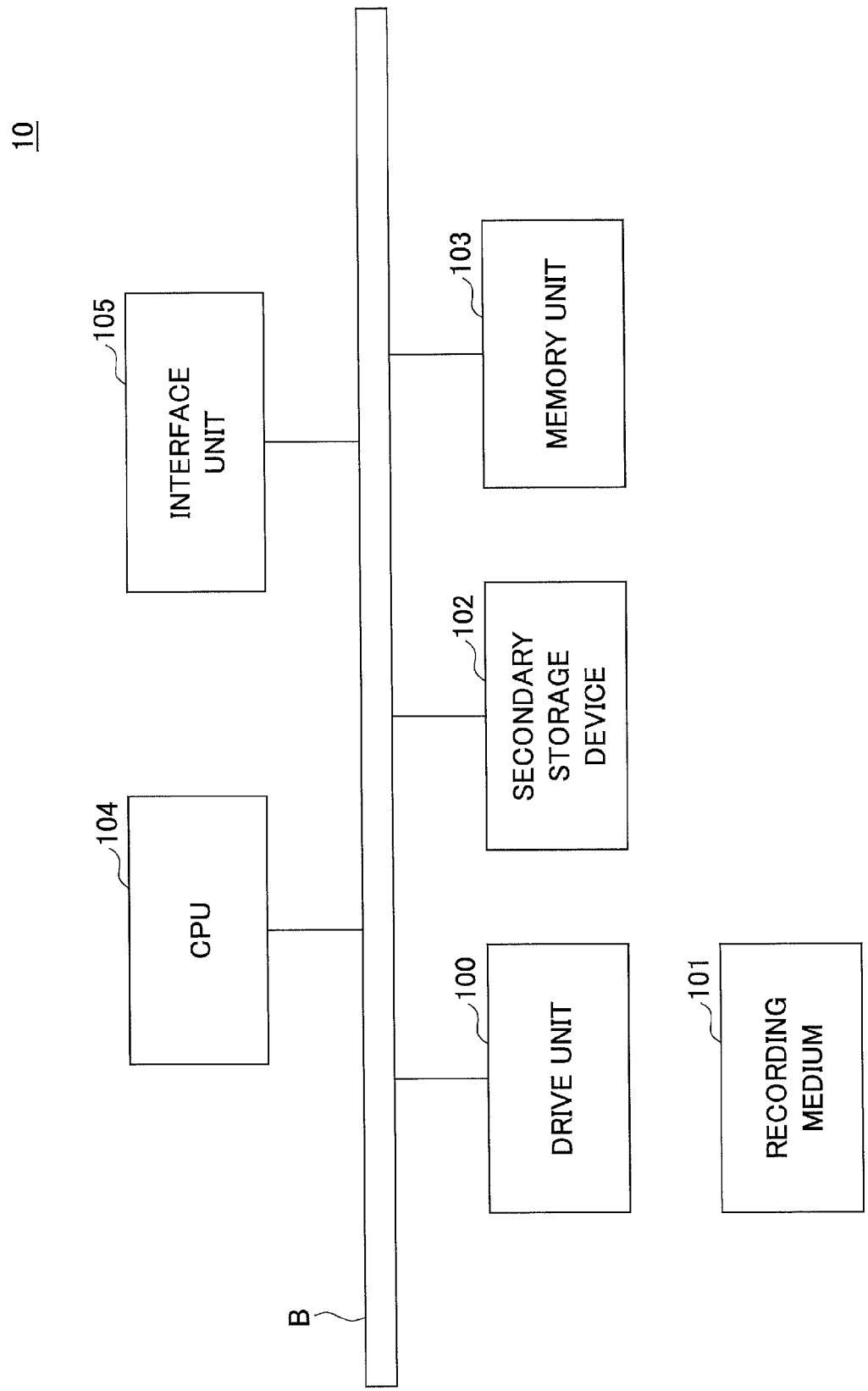
FIG. 2 is a diagram illustrating a hardware configuration of a management server according to the first embodiment.

FIG. 2 is a diagram illustrating a hardware configuration of a management server according to the first embodiment. Referring to FIG. 2, the management server 10 includes a drive unit 100, a secondary storage device 102, a memory unit 103, a central processing unit (CPU) 104, and an interface unit 105, all of which are interconnected by a bus B.

A program that implements processes in the management server 10 is provided by way of a recording medium 101 such as a CD-ROM. When the recording medium 101 storing the program is loaded in the drive unit 100, the program is installed in the secondary storage device 102 from the recording medium 101 via the drive unit 100. The program, however, does not always have to be installed from the recording medium 101, and may alternatively be downloaded from another computer via a network. The secondary storage device 102 stores files and data as well as installed programs.

The memory unit 103, in response to a command to activate a program, reads the program from the secondary storage device 102 and stores the read program. The CPU 104 executes functions pertaining to the management server 10 in accordance with a program stored in the memory unit 103. The interface unit 105 is used as an interface for connecting to a network.

Figure 3:
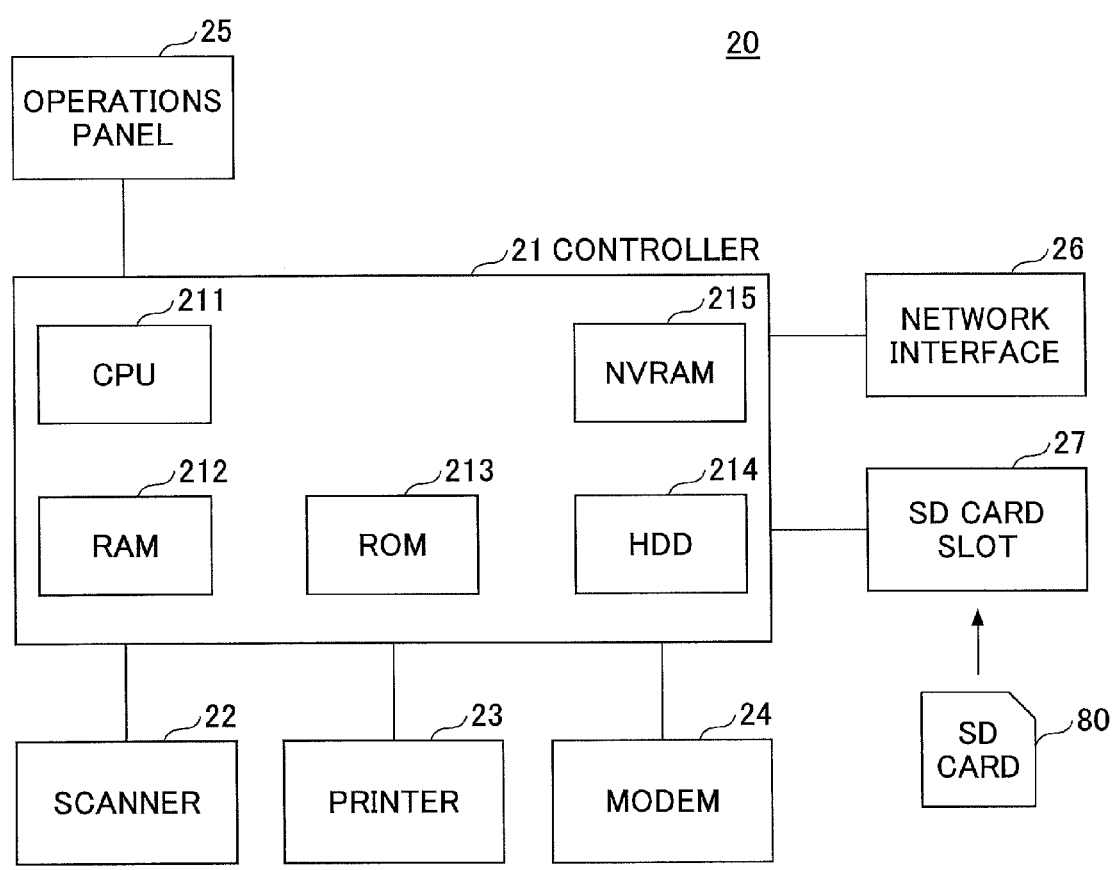
FIG. 3 is a diagram illustrating a hardware configuration of an image forming apparatus according to the first embodiment.

FIG. 3 is a diagram illustrating a hardware configuration of an image forming apparatus according to the first embodiment. Referring to FIG. 3, the image forming apparatus 20 includes hardware items including a controller 21, a scanner 22, a printer 23, a modem 24, an operations panel 25, a network interface 26, and an SD card slot 27.

The controller 21 includes a CPU 211, a random access memory (RAM) 212, a read-only memory (ROM) 213, a hard disk drive (HDD) 214, and a nonvolatile RAM (NVRAM) 215. The ROM 213 contains various programs and data used by the programs. The RAM 212 is used as a storage area for loading a program and as a work area for the loaded program. The CPU 211 implements various functions by executing a program loaded into the RAM 212. The HDD 214 contains programs and various data used by the programs. The NVRAM 215 contains various kinds of configuration information.

The scanner 22 is a hardware item (an image reading part) that reads image data from an original material. The printer 23 is a hardware item (a printing part) that prints print data on a recording medium such as printing paper. The modem 24 is a hardware item for connecting to a telephone line, and is used for transmission and reception of image data through facsimile communications.

The operations panel 25 is a hardware item that includes an input part for receiving a user's input, such as a button, and a display part such as a liquid crystal panel. The liquid crystal panel may have a touchscreen panel function. In this case, the liquid crystal panel also has the function of the input part. The network interface 26 is a hardware item for connecting to a network (either wired or wireless) such as a LAN.

The SD card slot 27 is used to read a program stored in an SD card 80. That is, according to the image forming apparatus 20, not only a program stored in the ROM 213 but also a program stored in the SD card 80 may be loaded into the RAM 212 and executed. The SD card 80 may be replaced with other recording media (such as a CD-ROM and a universal serial bus (USB) memory). That is, a recording medium corresponding to the position of the SD card 80 is not limited to a predetermined kind. In this case, the SD card slot 27 may be replaced with a hardware item corresponding to the kind of recording medium that replaces the SD card 80.

Figure 4:
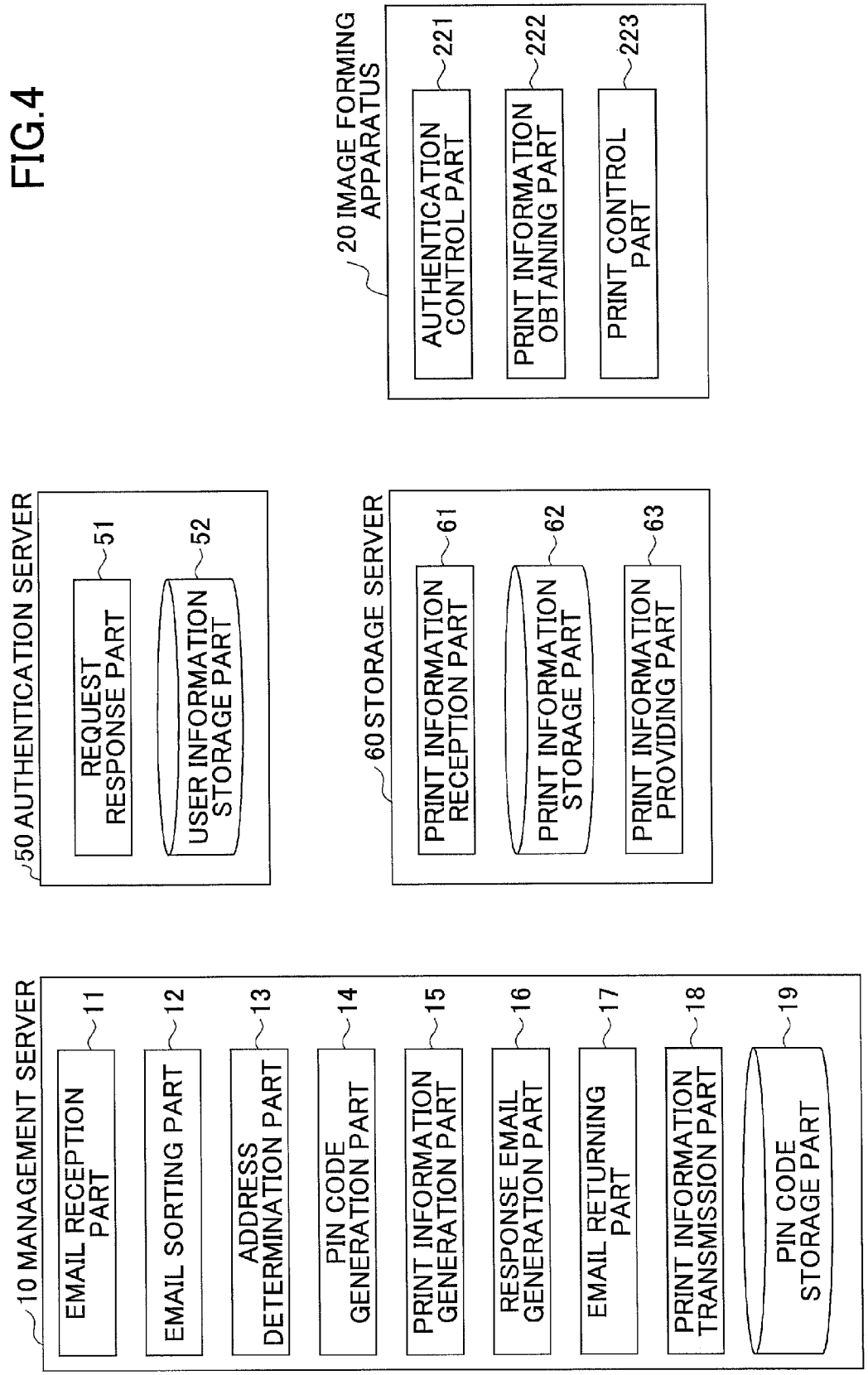
FIG. 4 is a diagram illustrating a functional configuration of an information processing system according to the first embodiment.

FIG. 4 is a diagram illustrating a functional configuration of an information processing system according to the first embodiment. Referring to FIG. 4, the management server 10 includes an email reception part 11, an email sorting part 12, an address determination part 13, a PIN code generation part 14, a print information generation part 15, a response email generation part 16, an email returning part 17, and a print information transmission part 18, all of which are implemented by processing that the CPU 104 is caused to execute by one or more programs installed in the management server 10.

Furthermore, the management server 10 uses a PIN code storage part 19. The PIN code storage part 19 may be implemented using the secondary storage device 102 (FIG. 2) or a storage device connected to the management server 10 via a network.

The email reception part 11 receives a PIN request email message or a print request email message from the mail server 40. The destination addresses of the PIN request email message and the print request email message are predetermined. Accordingly, the email reception part 11 receives an email message to a predetermined address as a PIN request email message or a print request email message. In the first embodiment, it is assumed that the PIN request email message and the print request email message have a common destination address.

In the first embodiment, a validity period is set with respect to a PIN code. By setting a validity period with respect to a PIN code, it is possible to reduce a possibility that the PIN code becomes known to others. As the validity period becomes shorter, the security of the PIN code becomes higher. On the other hand, if the validity period of a PIN code is fixed, it may become difficult to ensure convenience according to the circumstances of a guest user. Therefore, according to the first embodiment, the destination address is caused to differ depending on the validity period. For example, a destination address for a validity period of one day, a destination address for a validity period of three days, and a destination address for a validity period of five days are provided. That is, according to the first embodiment, the validity period of the PIN code is specified in the destination address of the print request email message or the PIN request email message. The validity periods of one day, three days, and five days are mere examples. Accordingly, a destination address corresponding to a validity period different from those examples may be provided.

The PIN request email message and the print request email message transmitted by a guest user need to include an email address stored in the user information storage part 52 with respect to any of the authorized users (hereinafter referred to as "authorized address"). For example, a guest user may be notified of an authorized address by an authorized user who has authorized the guest user to use the image forming apparatus 20. For example, the authorized address may be specified in the CC (carbon copy) address or BCC (blind carbon copy) address or included in the title (subject) or text of the PIN request email message or the print request email message.

The email sorting part 12 determines the purpose of an email message received by the email reception part 11. For example, the email sorting part 12 determines whether the email message is a PIN request email message or a print request email message.

The address determination part 13 transmits, to the authentication server 50, a request (an email address existence determination request) to determine the existence of the source address of a PIN request email message or a print request email message or the existence of an authorized address included in a PIN request email message or a print request email message. As a result, it is determined whether or not the source address or the authorized address is registered with the authentication server 50. If the source address or the authorized address is registered with the authentication server 50, the address determination part 13 obtains a username corresponding to the address from the authentication server 50.

The PIN code generation part 14 generates a PIN code when a transmitter of a PIN request email message is authorized to be given authority to operate the image forming apparatus 20. Furthermore, the PIN code generation part 14 generates a PIN code when a transmitter of a print request email message whose source address is not an authorized address is authorized to be given authority to operate the image forming apparatus 20. No PIN code is generated in response to a print request email message whose source address is an authorized address. This is because a transmitter of such a print request email message is an authorized user and has already had authority to operate the image forming apparatus 20.

The print information generation part 15 generates print information corresponding to a print request email message. The print information includes a username or a PIN code in addition to information on print data and a print job for the print data.

The response email generation part 16 generates an email message as a response to a PIN request email message or a print request email message (hereinafter referred to as "response email message"). The response email message responding to a PIN request email message includes an issued PIN code. The response email message responding to a print request email message includes the identification information of a print job based on individual print data. When a PIN code is generated in response to a print request email message, the response email message includes the generated PIN code.

The email returning part 17 returns a response email message to the source address of a PIN request email message or a print request email message. The print information transmission part 18 stores print information in the storage server 60 by transmitting the print information to the storage server 60. The PIN code storage part 19 stores a PIN code generated by the PIN code generation part 14 in correlation with the source address of a PIN request email message or a print request email message.

The authentication server 50 includes a request response part 51 and the user information storage part 52. The user information storage part 52 stores the user information of each authorized user. The request response part 51 executes processes corresponding to an authentication request, an email address existence determination request, and a request to obtain a username corresponding to an email address. The request response part 51 is implemented by a process that the CPU of the authentication server 50 is caused to execute by a program installed in the authentication server 50. The user information storage part 52 may be implemented using a secondary storage device of the authentication server 50 or a storage device connected to the authentication server 50 via a network.

The storage server 60 includes a print information reception part 61, a print information storage part 62, and a print information providing part 63. The print information reception part 61 receives print information transmitted from the management server 10 and stores the received print information in the print information storage part 62. The print information providing part 63, in response to a request to obtain print information from the image forming apparatus 20, retrieves print information including a username or a PIN code specified in the obtaining request from among the print information stored (retained) in the print information storage part 62 and returns the retrieved print information to the image forming apparatus 20.

The print information reception part 61 and the print information providing part 63 are implemented by a process that the CPU of the storage server 60 is caused to execute by one or more programs installed in the storage server 60. The print information storage part 62 may be implemented using a secondary storage device of the storage server 60 or a storage device connected to the storage server 60 via a network.

The image forming apparatus 20 includes an authentication control part 221, a print information obtaining part 222, and a print control part 223, all of which are implemented by a process that the CPU 211 (FIG. 3) is caused to execute by one or more programs installed in the image forming apparatus 20.

The authentication control part 221 receives a user's input of a username and a password or a user's input of a PIN code. When a username and a password are input (entered), the authentication control part 221 requests the authentication server 50 to perform authentication based on the input username and password. When a PIN code is input, the authentication control part 221 determines whether the PIN code is stored in the PIN code storage part 19. The print information obtaining part 222 transmits a request to obtain print information to the storage server 60. In the obtaining request, at least one of the username and the PIN code received by the authentication control part 221 is specified. The print control part 223 executes a printing process with respect to the print data obtained by the print information obtaining part 222.

Figure 5:
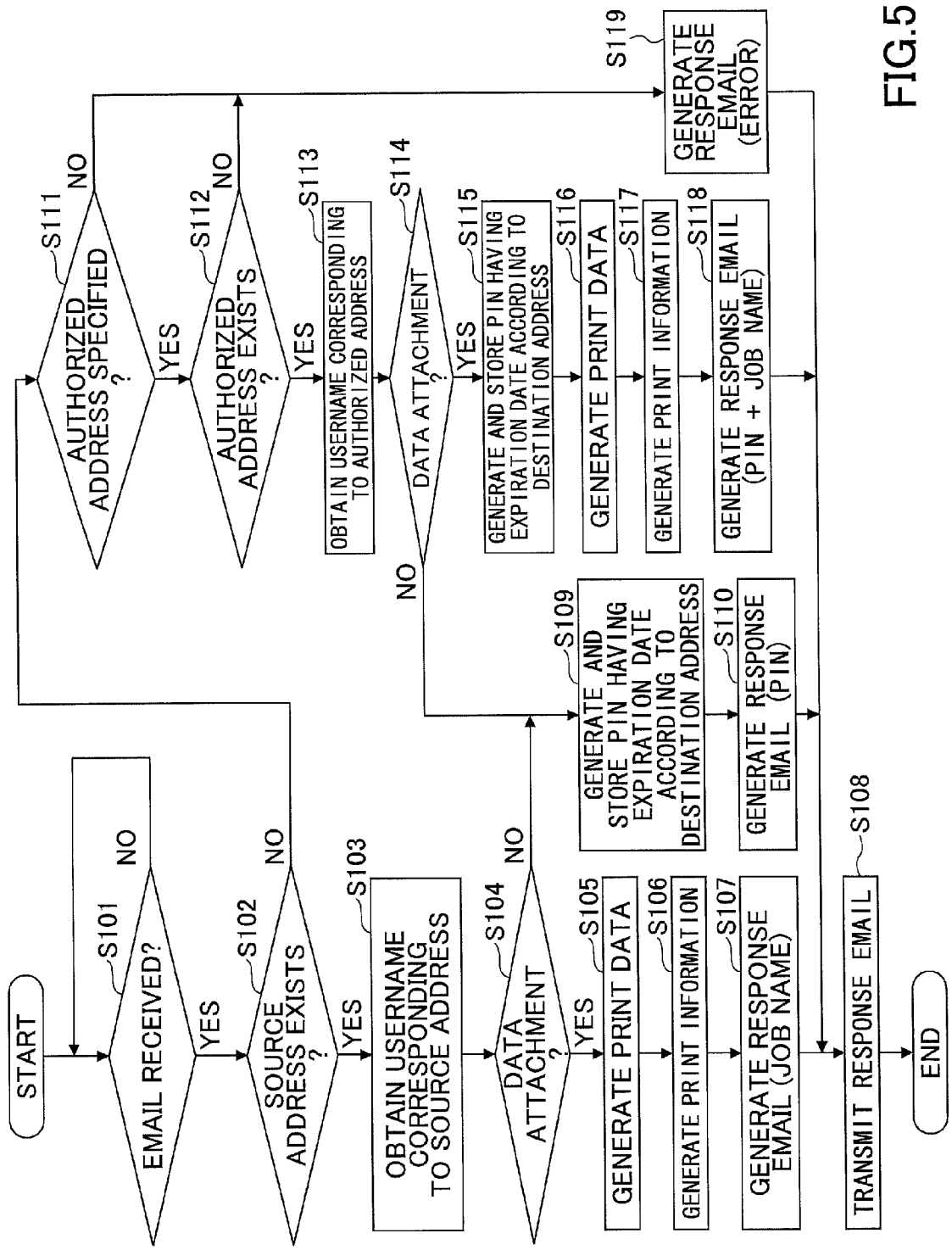
FIG. 5 is a flowchart for illustrating a procedure for a process executed by a management server in response to reception of an email message according to the first embodiment.

A description is given below of a procedure for a process executed in the information processing system 1. FIG. 5 is a flowchart for illustrating a procedure for a process executed by a management server in response to reception of an email message according to the first embodiment.

Referring to FIG. 5 as well as FIG. 4, at step S101, the email reception part 11 of the management server 10 waits for a PIN request email message or a print request email message to be received. That is, the email reception part 11 determines whether a PIN request email message or a print request email message has been received. For example, the email reception part 11 monitors reception of an email message to a predetermined address in the mail server 40 by polling. If such an email message has been received in the mail server 40 and obtained by the email reception part 11 (YES at step S101), at step S102, the address determination part 13 determines whether the source address of the email message exists by transmitting a request to determine the existence of the source address to the authentication server 50. The request response part 51 of the authentication server 50 determines whether the email address specified in the existence determination request is included in the user information stored in the user information storage part 52 as the email address of any user information.

FIG. 6 is a diagram illustrating a configuration of a user information storage part according to the first embodiment. Referring to FIG. 6, the user information storage part 52 stores user information with respect to each authorized user. The user information includes, for example, a username, a password, and an email address (authorized address). Multiple authorized addresses such as those for a PC and a mobile terminal may be registered for a single user.

The request response part 51 returns a response including a determination result to the management server 10. The determination result is information indicating the presence (existence) or absence of the source address.

If the determination result indicates the existence of the source address (YES at step S102), at step S103, the address determination part 13 obtains a username corresponding to the source address of the email message from the authentication server 50. That is, the username correlated with the source address in the user information storage part 52 is obtained.

Next, at step S104, the email sorting part 12 determines the presence or absence of a data attachment to the email message. In the case of the presence of a data attachment (YES at step S104), it is highly likely that the email message is a print request email message from an authorized user. Therefore, at step S105, the print information generation part 15 generates the print data of the data attachment. If multiple data attachments are included, the print information generation part 15 generates the print data of each data attachment. Furthermore, if the data attachment is in an archive file format such as a zip format including multiple files, the print information generation part 15 decompresses the archive files and generates the print data of each decompressed file. Accordingly, multiple print data items (multiple print jobs) may be generated with respect to a single print request email message. Print data may be generated with respect to the text of the print request email message.

Next, at step S106, the print information generation part 15 generates print information with respect to each print data item and transmits the generated print information to the storage server 60. In response to reception of the print information, the print information reception part 61 of the storage server 60 stores the received print information in the print information storage part 62.

FIG. 7 is a diagram illustrating a configuration of a print information storage part according to the first embodiment. Referring to FIG. 7, the print information storage part 62 stores print information with respect to each print data item (print data by print data). The print information includes a job name, a user mode, print data, and a username or a PIN code.

The job name is the identification information of each print data item or each print job executed with respect to each print data item. The user mode is information indicating whether the source address of a print request email message is an authorized address. In this embodiment, the user mode indicates whether a user who is a requestor of printing (requesting user) is an authorized user or a guest user, where "U" indicates an authorized user and "G" indicates a guest user. The username is the username of a user who is responsible for a print job based on the print information. The responsible user refers to, for example, a user to cover the cost related to the print job (while the cost may actually be covered by a department to which the user belongs), a user to be recorded in association with a log in the case of outputting the print job, or, in an environment where the account of the number of output printed sheets of paper (such as the accumulated number of sheets of paper) is managed with respect to each authorized user, a user whose account with respect to the print job is to be subject to the increment of the number of output printed sheets of paper. The PIN code is a PIN code assigned to the requesting user when the requesting user is a guest user.

At step S106, the print information is generated with respect to each print data item, and a job name corresponding to each print data item is included in the corresponding print information. In the user mode of each print information item, "U" is set. Furthermore, the username obtained at step S103 is set in each print information item. This print information is transmitted to the storage server 60.

Next, at step S107, the response email generation part 16 generates a response email message in which the job name of each print information item is described in, for example, the text. Next, at step S108, the email returning part 17 transmits the response email message to the source address of the print request email message.

It is possible for a user who has read the response email message to know a job name corresponding to each print data item generated in response to the print request email message. In the case where the source address is present (stored) in the user information storage part 52, however, it is not always necessary to return a response email message. This is because it is possible for a user to understand the contents of print data corresponding to each job name at the below-described time of operating the image forming apparatus 20 when the job name is generated based on the filename or the like of electronic data, for example.

On the other hand, if it is determined at step S104 that there is no data attachment to the email message (NO at step S104), it is highly likely that the email message is a PIN request email message from an authorized user. Therefore, at step S109, the PIN code generation part 14 generates a PIN code that has a value different from those of the PIN codes that have already been issued, and provides the PIN code with an expiration date (and time) based on a validity period corresponding to the destination address of the received email message. The expiration date based on the validity period is a value that indicates the next day if the validity period is one day, for example. The PIN code generation part 14 stores the generated PIN code in the PIN code storage part 19 in correlation with the source address of the PIN request email message, the username of the authorized user obtained at step S103, and the expiration date.

FIG. 8 is a diagram illustrating a configuration of a PIN code storage part according to the first embodiment. Referring to FIG. 8, the PIN code storage part 19 stores a generated PIN code in correlation with an email address, the username of an authorized user, and an expiration date. The email address is the source address of an email message that has triggered the issuance of the PIN code. The username is the username of an authorized user pertaining to the email message. When the source address is an authorized address, the authorized user pertaining to the email message is an authorized user pertaining to the authorized address. When the source address is not an authorized address, the authorized user pertaining to the email message is an authorized user pertaining to an authorized address separately specified in the email message. The expiration date is an expiration date based on a validity period corresponding to the destination address.

In the first embodiment, a PIN code that is newly generated may be generated by any method as long as the newly generated PIN code has a value different from those of the PIN codes that have already been issued (that is, the PIN codes stored in the PIN code storage part 19). It is desirable, however, that PIN codes be composed of characters that may be easily input through the operations panel 25 (FIG. 3) of the image forming apparatus 20 or software keyboards displayed on the operations panel 25.

Furthermore, if a pin code correlated with the source address of the email message received this time has already been stored in the PIN code storage part 19, a new record is separately generated in the PIN code storage part 19, and a new PIN code and an expiration date are stored in the record. Alternatively, a record that has already been stored with respect to the source address may be overwritten (updated) with a newly issued PIN code and an expiration date.

In the former case, it is necessary for a user to use different PIN codes. In particular, in the case of the print request email message, it is necessary to use a different PIN code for each object of printing. Specifically, it is necessary for a user to enter a PIN code corresponding to print information desired to be printed at the time of logging on to the image forming apparatus 20.

In the latter case, a user may use only the latest issued PIN code. In other words, the latest issued PIN code alone is valid.

Next, at step S110, the response email generation part 16 generates a response email message in which the generated PIN code is described in the text, for example. The response email message is transmitted to the source address of the PIN request email message at step S108. It is possible for the authorized user who has read the response email message to know a PIN code that is required to be input to the image forming apparatus 20 when it is desired to perform, for example, copying or scanning. For example, a PIN code may be issued to an authorized user who has operation authority (to operate the image forming apparatus 20) when the authorized user has the PIN code issued for a guest user who is a visitor to the authorized user. In this case, the authorized user notifies the guest user of the issued PIN code. As described below, the guest user may log on to the image forming apparatus 20 using the PIN code.

On the other hand, if the source address does not exist at step S102 (NO at step S102), at step S111, the address determination part 13 determines whether an authorized address is specified in the email message. For example, the address determination part 13 determines whether or not an authorized address is specified in the CC address, BCC address, title or text of the email message. It may be suitably determined how an authorized address should be specified.

If an authorized address is specified in the email message (YES at step S111), at step S112, the address determination part 13 determines the presence (existence) or absence of the authorized address in the same manner as at step S102. If the authorized address exists (YES at step S112), at step S113, the address determination part 13 obtains the username of an authorized user corresponding to the authorized address in the same manner as at step S103.

Next, at step S114, the email sorting part 12 determines the presence or absence of a data attachment to the received email message. In the case of the presence of a data attachment (YES at S114), it is highly likely that the email message is a print request email message from a guest user. Therefore, at step S115, the PIN code generation part 14 generates a PIN code and its expiration date in the same manner as at step S109. The PIN code generation part 14 stores the generated PIN code and expiration date in the PIN code storage part 19 (FIG. 8) in correlation with the source address of the print request email message and the username of the authorized user obtained at step S113.

Next, the print information generation part 15 generates print data at step S116 in the same manner as at step S105, and generates and transmits print information to the storage server 60 at step S117 in the same manner as at step S106. In the user mode of each print information item generated at step S117, however, "G" is set. Furthermore, in each print information item, the username of the authorized user obtained at step S113 and the PIN code generated at step S115 are set. For example, in FIG. 7, the first record is an example of print information generated at step S117.

Next, at step S118, the response email generation part 16 generates a response email message in which the PIN code as well as the job name of each print information item is described in the text, for example. The response email message is transmitted to the source address of the print request email message at step S108. It is possible for the guest user who has read the response email message to know a PIN code that is required to be input to the image forming apparatus 20 at the time of printing the print data generated in response to the print request email message. Furthermore, it is possible for the user to know a job name corresponding to each print data item. The job name, however, does not necessarily have to be included in the response email message.

On the other hand, if it is determined at step S114 that there is no data attachment to the email message (NO at step S114), it is highly likely that the email message is a PIN request email message from a guest user. Therefore, in this case, steps S109 and S110 described above are executed. That is, a PIN code is issued to the guest user. It is possible for the guest user to log on to the image forming apparatus 20 using the issued PIN code as described below.

Furthermore, if no authorized address is specified in the print request email message from the guest user (NO at step S111) or if the email address specified as an authorized address is not an authorized address (NO at step S112), at step S119, the response email generation part 16 generates, for example, a response email message including an error message (hereinafter referred to as "error email message"). In this case, the error email message is transmitted at step S108.

A response email message including a PIN code may include the expiration date of the PIN code. This makes it possible for a user to know the expiration date of the issued PIN code.

An authorized address is specified with respect to email messages whose source address is not an authorized address in order to prevent unauthorized use of the image forming apparatus 20 by a guest user and to clarify a billing destination with respect to usage of the image forming apparatus 20 by a guest user. For example, when an authorized address is specified in the CC address or BCC address of an email message whose source address is not an authorized address, it is possible for the authorized user to instantaneously know that a print request email message or a PIN request email message has been transmitted by a guest user. Accordingly, it is possible to detect the occurrence of a print request email message or a PIN request email message that is not intended by the authorized user. As a result, it is possible to prevent unauthorized use by a guest user. An authorized address may be specified together with the destination address of a print request email message or a PIN request email message in the destination address ("To" box) in place of the CC address or BCC address.

Furthermore, when it is necessary to have an authorized address specified in the title or text, the management server 10 may, for example, transfer a print request email message or a PIN request email message to the authorized address. By doing so, it is also possible to obtain the same effect as in the case of specifying an authorized address in the CC address or BCC address.

Furthermore, specifying an authorized address with respect to an email message whose source address is not an authorized address makes it possible to associate a PIN code generated based on the email message with the authorized user. In this embodiment, such association is retained in the PIN code storage part 19. Based on the association of the PIN code and the authorized user, it is possible to associate, with the authorized user, a job executed by the image forming apparatus 20 that has been logged on to using the PIN code. Accordingly, for example, it is possible to make it possible to identify an authorized user who is a billing destination with respect to a job that a guest user has caused the image forming apparatus 20 to execute.

The specification of an authorized address, however, may be omitted with respect to email messages from guest users depending on the required level of security. In this case, there may be no execution of steps S112 and S113.

Next, a description is given of a procedure for a process executed by the image forming apparatus 20 in accordance with a user's operation of the image forming apparatus 20.

Figure 9:
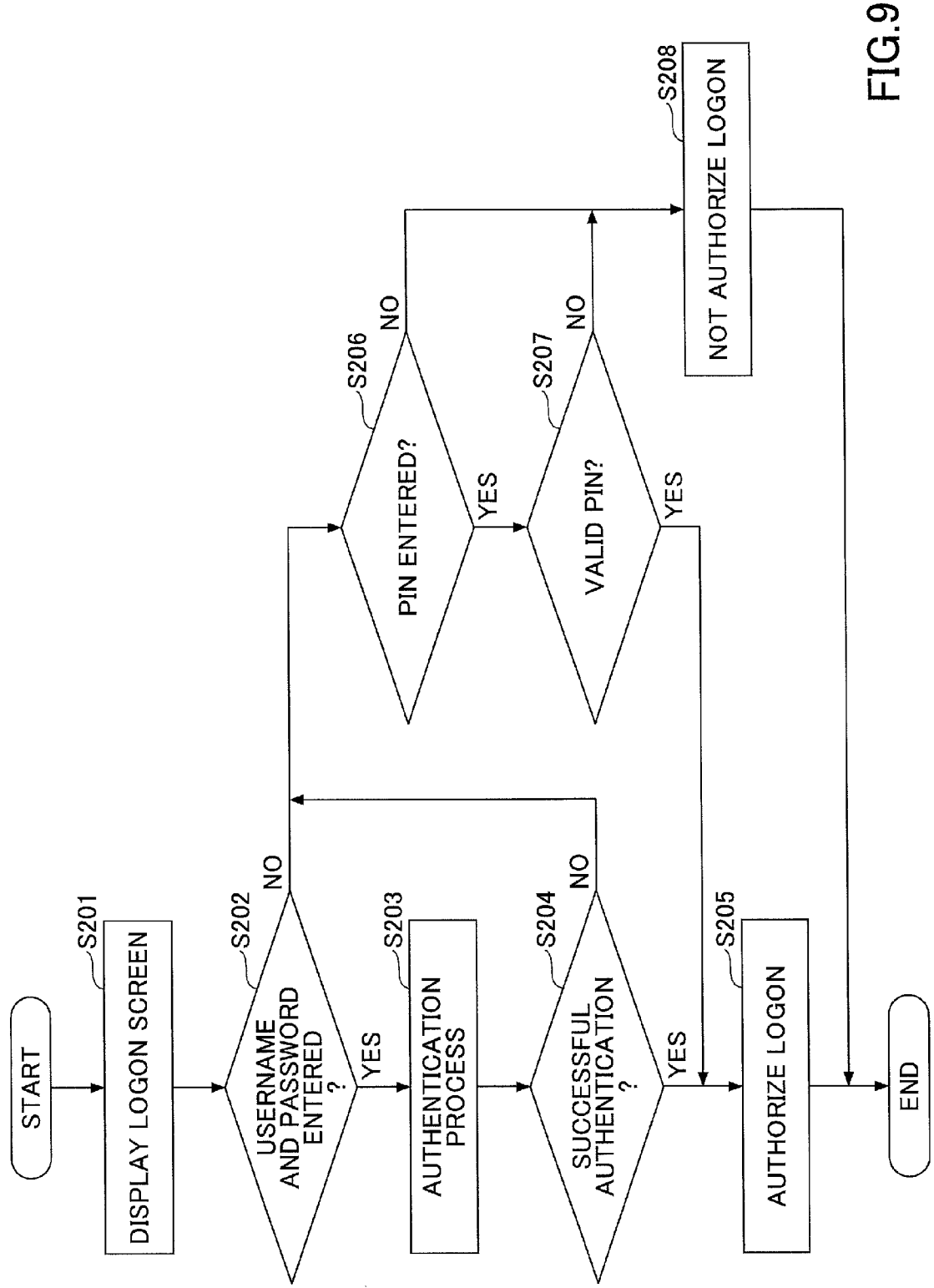
FIG. 9 is a flowchart for illustrating a procedure for a process for logging on to an image forming apparatus according to the first embodiment.

FIG. 9 is a flowchart for illustrating a procedure for a process for logging on to an image forming apparatus according to the first embodiment.

Referring to FIG. 9 as well as FIG. 4, at step S201, after activation of the image forming apparatus 20 or after the logoff of another user, the authentication control part 221 causes a logon screen to be displayed on the operations panel 25 (FIG. 3).

Figure 10:
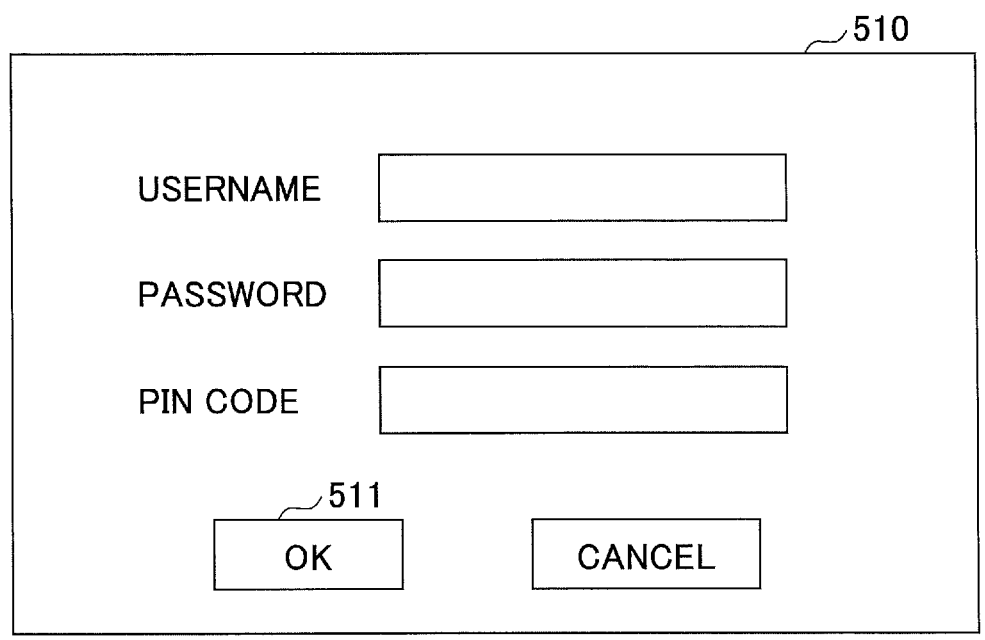
FIG. 10 is a diagram illustrating a display example of a logon screen.

FIG. 10 is a diagram illustrating a display example of a logon screen. Referring to FIG. 10, a logon screen 510 includes fields for entering a username, a password, and a PIN code.

For example, when an operator of the image forming apparatus 20 is an authorized user, a username and a password are entered on the logon screen 510. On the other hand, when the operator is a guest user, a PIN code of which the operator has been notified by a response email message or a PIN code of which the operator has been notified by an authorized user is entered on the logon screen 510.

The authorized user also may enter a PIN code. For example, when the authorized user transmits a print request email message from the email address of the user terminal 30 for private use, that is, from an email address that is not an authorized address, a response email message returned to the user terminal 30 includes a PIN code. Meanwhile, the authorized user may have separately transmitted a print request email message from an authorized address. In this case, with respect to the authorized user, print data associated with the PIN code and print data associated with the username are stored in the storage server 60. In order to enable a printing process to be executed for both print data by a single logon operation, the username and password and the PIN code may be simultaneously entered.

When at least either a username and password or a PIN code is entered on the logon screen 510 and an OK button 511 is depressed, at step S202, the authentication control part 221 determines whether a username and password are entered on the logon screen 510. If a username and password are entered (YES at step S202), at step S303, the authentication control part 221 performs authentication. For example, the authentication control part 221 transmits an authentication request in which the entered username and password are specified to the authentication server 50.

The request response part 51 of the authentication server 50 determines whether the combination of the username and password specified in the authentication request is stored in the user information storage part 52. If the combination is stored in the user information storage part 52, the authentication succeeds. If the combination is not stored in the user information storage part 52, the authentication fails. The request response part 51 returns information indicating the success or failure of the authentication to the authentication control part 221 of the image forming apparatus 20, which has requested the authentication.

If it is determined at step S204 that the authentication has succeeded (YES at step S204), at step S205, the authentication control part 221 authorizes the operator to log on, and stores the entered username in, for example, the RAM 212 (FIG. 3) as logon information. Furthermore, if a PIN code has been entered along with the username and password with which the authentication has succeeded, the PIN code also is included in the logon information and stored in the RAM 212. In this case, the operator is enabled to cause the image forming apparatus 20 to execute, for example, scanning, copying, facsimile transmission or a print job based on print information stored in the storage server 60 within authority corresponding to the entered username.

On the other hand, if a username and password are not entered on the logon screen 510 (NO at step S202) or if the authentication based on the username and password fails (NO at step S204), at step S206, the authentication control part 221 determines whether a PIN code is entered on the logon screen 510. If a PIN code is entered (YES at step S206), at step S207, the authentication control part 221 determines the validity of the PIN code. For example, if the PIN code is stored in the PIN code storage part 19 and an expiration date stored in correlation with the PIN code is not over, the PIN code is determined as being valid. If these conditions are not satisfied, the PIN code is determined as being invalid. In the case where a valid PIN code is stored in the PIN code storage part 19, the email address and the username of an authorized user stored in correlation with the PIN code are obtained from the PIN code storage part 19.

If the entered PIN code is valid (YES at step S207), at step S205, the authentication control part 221 authorizes the operator to log on, and stores the PIN code and the email address and the username of an authorized user correlated with the PIN code in, for example, the RAM 212 (FIG. 3) as logon information. In this case, the operator is enabled to cause the image forming apparatus 20 to execute, for example, scanning, copying, facsimile transmission or a print job based on print information stored in the storage server 60 within authority given to a guest user.

On the other hand, if the entered PIN code is invalid (NO at step S207), at step S208, the authentication control part 221 does not authorize the operator to log on. In this case, for example, the logon screen 510 remains displayed and the operator is prevented from using the image forming apparatus 20.

In the case where the image forming apparatus 20 executes a job in accordance with an operation by an operator who has successfully logged on, the image forming apparatus 20 may record logon information as part of log data. This makes it possible to identify a responsible authorized user with respect to each job. Furthermore, in the case where the operator is a guest user, by recording the email address of the guest user in log data, it is possible to expect a psychological deterrent effect over unauthorized use by a guest user and an increased possibility of tracking a guest user who has made unauthorized use of the image forming apparatus 20. The email address of a guest user, however, does not always have to be included in log data. In this case, the email address does not have to be stored in the PIN code storage part 19.

Next, a description is given of a procedure for a process executed by the image forming apparatus 20 when an instruction to execute a print job based on print information stored in the storage server 60 is input by an operator authorized to log on.

Figure 11:
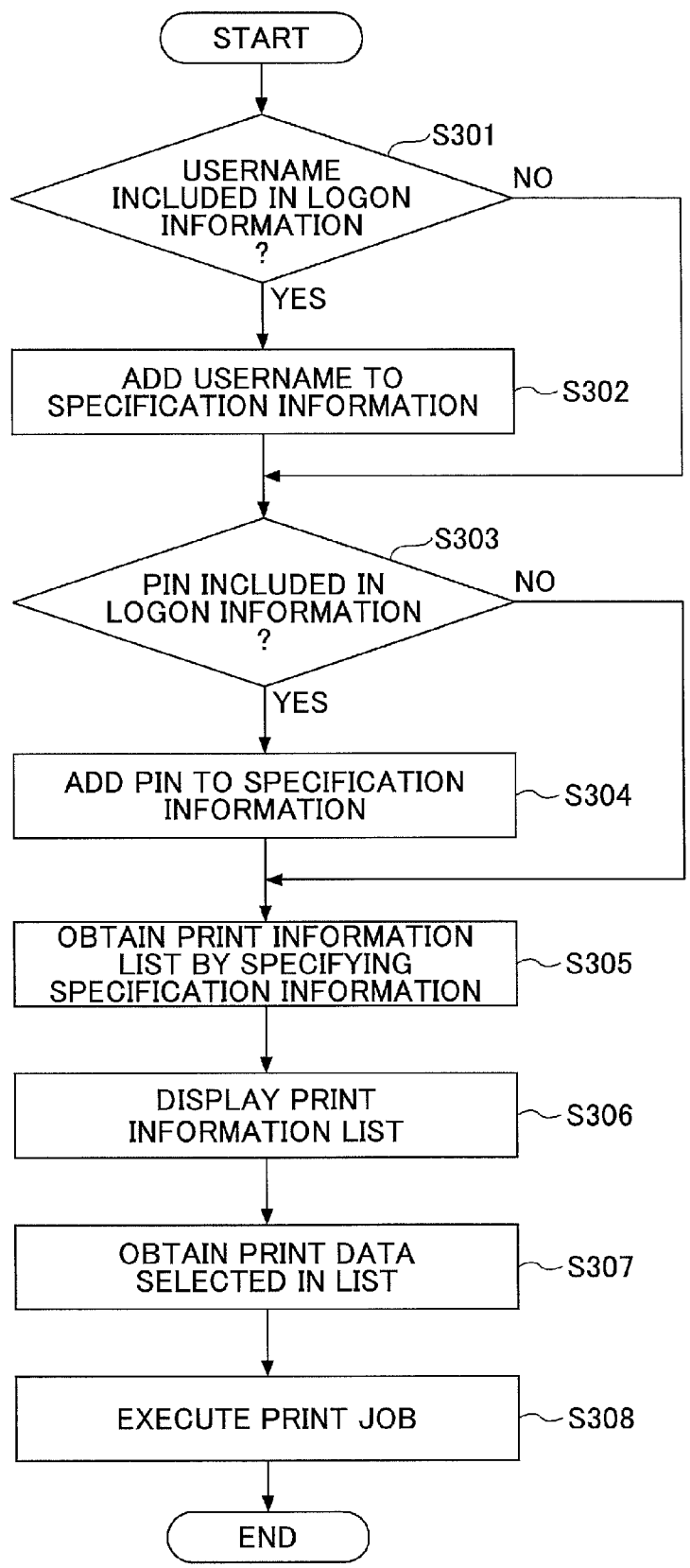
FIG. 11 is a flowchart for illustrating a procedure for a process for executing a print job based on print information stored in a storage server according to the first embodiment.

FIG. 11 is a flowchart for illustrating a procedure for a process for executing a print job based on print information stored in a storage server according to the first embodiment.

Referring to FIG. 11 as well as FIG. 4, at step S301, the print information obtaining part 222 determines whether a username is included in logon information. If a username is included in logon information (YES at step S301), at step S302, the print information obtaining part 222 adds the username to specification information. The specification information is information specified in obtaining a list of print information items from the storage server 60 at subsequent step S305.

Next, at step S303, the print information obtaining part 222 determines whether a PIN code is included in the logon information. If a PIN code is included in the print information (YES at step S303), at step S304, the print information obtaining part 222 adds the PIN code to the specification information.

Next, at step S305, the print information obtaining part 222 specifies the specification information and obtains a list of print information items from the storage server 60. To be more specific, the print information obtaining part 222 transmits a request to obtain a list of print information items, specifying the specification information, to the storage server 60. In response to the obtaining request, the print information providing part 63 of the storage server 60 obtains print information that includes the specification information specified in the obtaining request from the print information storage part 62 (FIG. 7). That is, when a username is included in the logon information, print information whose user mode is "U" and that includes the username is obtained. When a PIN code is included in the logon information, print information whose user mode is "G" and that includes the PIN code is obtained.

When a username and a PIN code are included in the logon information, print information whose user mode is "U" and that includes the username and print information whose user mode is "G" and that includes the PIN code are obtained.

The print information providing part 63 returns a list of the obtained print information items to the image forming apparatus 20. Print data do not have to be included in the returned print information.

Next, at step S306, the print information obtaining part 222 of the image forming apparatus 20 causes a list of the job names, etc., included in the returned print information to be displayed on the operations panel 25 (FIG. 3). The list is a list of candidate objects of printing. That is, it is possible for a user to input an instruction to execute printing with respect to the print information (items) included in the list.

If at least one job name is selected from the list, at step S307, the print information obtaining part 222 obtains print data corresponding to the job name from the storage server 60. To be more specific, the print information obtaining part 222 transmits a request to obtain print data in which the job name is specified to the storage server 60. In response to the obtaining request, the print information providing part 63 of the storage server 60 returns print data corresponding to the job name specified in the obtaining request to the image forming apparatus 20.

In the case where the print information of a single print data item alone is obtained by the username or PIN code included in the logon information, the print information obtaining part 222 may automatically obtain print data without executing the process of step S306. Furthermore, the print information providing part 63 may return print data obtained by the username or PIN code instead of returning a list of print information items to the image forming apparatus 20.

Next, at step S308, the print control part 223 controls execution of a print job related to the print data. As a result, paper on which the print data are printed is output.

As described above, according to the first embodiment, a guest user who does not have an account may be provided with a PIN code that is a temporary or quasi account. Furthermore, because the PIN code differs between guest users, it is possible to improve security between guest users compared with the case of sharing an account between guest users.

Next, a description is given of a second embodiment. In the second embodiment, differences from the first embodiment are illustrated. Accordingly, the second embodiment may be the same as the first embodiment with respect to the points not referred to in particular.

In the second embodiment, it is assumed that there is a single destination address for the PIN request email message and the print request email message. That is, the destination address is not provided validity period by validity period. On the other hand, the validity period of a PIN code may be specified by other than the destination address of the PIN request email message and the print request email message. For example, a validity period is specified in the title or text of the PIN request email message or the print request email message in a predetermined format as follows:

(a) expiration_time=2, or
(b) expiration_date=3, where (a) indicates that the validity period is two hours, that is, the expiration time is two hours later, and (b) indicates that the validity period is three days, that is, the expiration date is three days later.

If no validity period is specified, the validity period of a PIN code is determined to be a default value. Alternatively, the validity period may be determined to be a default value when a predetermined description is included as an indicator of the validity period of a default value as (3) or (4) illustrated below:

(3) expiration_time=?, or
(4) expiration_date=?.

The above-described formats for specifying a validity period are mere examples. The validity period may be specified by other formats.

Figure 12:
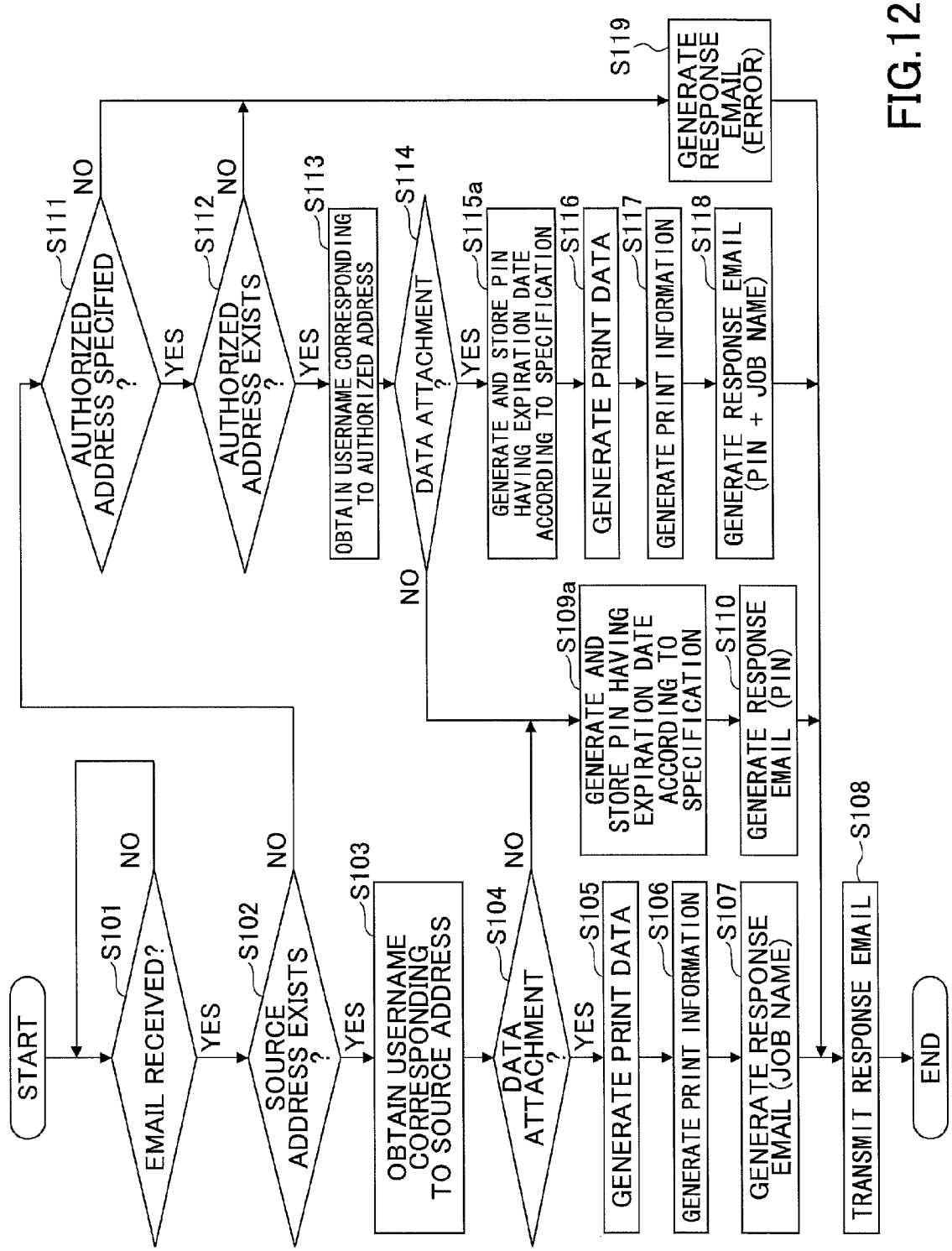
FIG. 12 is a flowchart for illustrating a procedure for a process executed by a management server in response to reception of an email message according to a second embodiment.

FIG. 12 is a flowchart for illustrating a procedure for a process executed by a management server in response to reception of an email message according to the second embodiment. In FIG. 12, the same steps as those of FIG. 5 are referred to by the same step numbers, and their description is omitted.

In FIG. 12, steps S109 and S115 of FIG. 5 are replaced with steps S109a and S115a, respectively.

Referring to FIG. 12 as well as FIG. 4, at step S109a, the PIN code generation part 14 generates a PIN code that has a value different from those of the PIN codes that have already been issued, and provides the PIN code with an expiration date (and time) corresponding to the validity period specified in the received email message. The PIN code generation part 14 stores the generated PIN code in the PIN code storage part 19 in correlation with the source address of the PIN request email message, the username of the authorized user obtained at step S103, and the expiration date.

At step S115a, the same process as at step S109a is executed.

As described above, according to the second embodiment, it is possible to provide a PIN code with an expiration date specified by a user as desired. Accordingly, it is possible to increase flexibility with respect to provision of an expiration date to the PIN code.

In the above embodiments, a description is given of the case where a print request or a PIN code issuance request is transmitted in the form of email and a PIN code is returned in the form of email. The communication method for requesting printing or issuance of a PIN code and for returning a PIN code is not limited to email. For example, such requesting and returning may be performed using a Web interface or other communication methods. For example, in the case of a Web interface, the different destination addresses according to the validity period in the above-described embodiments may be replaced with the different URLs of transmission destinations to which requests are transmitted. Furthermore, the source address may be replaced with the IP address of a transmission source from which a request is transmitted. For example, the IP address of the user terminal 30 used by an authorized user may be stored in the user information storage part 52 in place of or along with the email address. Furthermore, the IP address of a transmission source from which a request is transmitted may be stored in the PIN code storage part 19 in place of the email address.

Furthermore, in the above-described embodiments, the PIN code is illustrated as an example of identification information for identifying authority to operate the image forming apparatus 20. Alternatively, the PIN code may be used as identification information for identifying authority to operate other apparatuses such as projectors and video conference systems.

In the above-described embodiments, the PIN code is an example of authority identification information. The email reception part 11 is an example of a reception part. The PIN code generation part 14 is an example of a generation part. The email returning part 17 is an example of a transmission part.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

What is claimed is:

1. An information processing system including one or more computers, comprising:
   one or more hardware processors; and
   one or more memories that contain instructions that when executed cause the one or more hardware processors to:
   receive an email addressed to a predetermined destination, the email to request obtainment of authority identification information for identifying operation authority of an apparatus;
   set a validity period to the authority identification information corresponding to the received email, the validity period being determined based on the received email; and
   transmit the authority identification information to a transmission source of the email;
   wherein the received email contains an attached file; the authority identification information used for the attached file; and
   the validity period is a period in which it is possible to output the attached file.

2. The information processing system as claimed in claim 1, wherein the instructions when executed cause the one or more hardware processors to generate the authority identification information; wherein the validity period is determined based on the destination of the received email.

3. The information processing system as claimed in claim 1, wherein the instructions when executed cause the one or more hardware processors to generate the authority identification information; wherein the validity period is determined based on content of the received email.

4. An information processing apparatus, comprising:
   one or more hardware processors; and
   one or more memories that contain instructions that when executed cause the one or more hardware processors to:
   receive an email addressed to a predetermined destination, the email to request obtainment of authority identification information for identifying operation authority of an apparatus;
   set a validity period to the authority identification information corresponding to the received email, the validity period being determined based on the received email; and
   transmit the authority identification information to a transmission source of the email;
   wherein: the received email contains an attached file; the authority identification information used for the attached file; and
   the validity period is a period in which it is possible to output the attached file.

5. The information processing apparatus as claimed in claim 4, wherein the instructions when executed cause the one or more hardware processors to generate the authority identification information; wherein the validity period is determined based on the destination of the received email.

6. The information processing apparatus as claimed in claim 4, wherein the instructions when executed cause the one or more hardware processors to generate the authority identification information; wherein the validity period is determined based on content of the received email.

7. An information processing method, comprising:
   receiving an email addressed to a predetermined destination, the email to request obtainment of authority identification information for identifying operation authority of an apparatus;

setting a validity period to the authority identification information corresponding to the received email, the validity period being determined based on the received email; and transmitting the authority identification information to a transmission source of the email, wherein: the received email contains an attached file; the authority identification information used for the attached file; and the validity period is a period in which it is possible to output the attached file;

wherein an information processing system including one or more computers executes said receiving, generating and transmitting.

8. The information processing method as claimed in claim 7, further comprising generating the authority identification information; wherein the validity period is determined based on the destination of the received email.

9. The information processing method as claimed in claim 7, further comprising generating the authority identification information; wherein the validity period is determined based on content of the received email.

10. The information processing system as claimed in claim 2, wherein the destination of the received email is one destination among a plurality of destinations respectively provided for a plurality of the validity periods.

11. The information processing apparatus as claimed in claim 5, wherein the destination of the received email is one destination among a plurality of destinations respectively provided for a plurality of the validity periods.

12. The information processing method as claimed in claim 8, wherein the destination of the received email is one destination among a plurality of destinations respectively provided for a plurality of the validity periods.

* * * * *